Jan. 27, 1953          G. BEZY          2,627,050
ELECTRONIC DEVICE FOR VERY HIGH FREQUENCIES
Filed May 14, 1947          2 SHEETS—SHEET 1
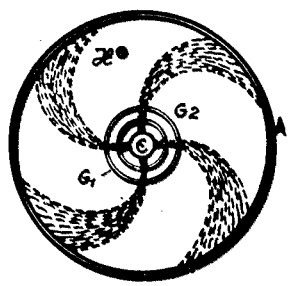
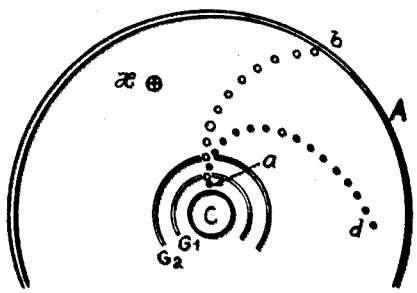
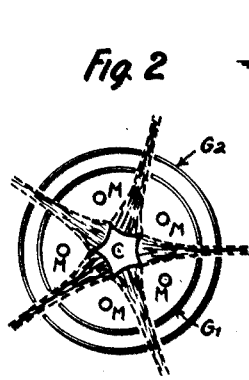
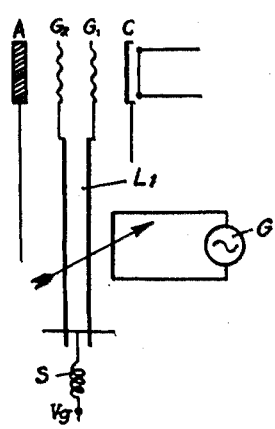
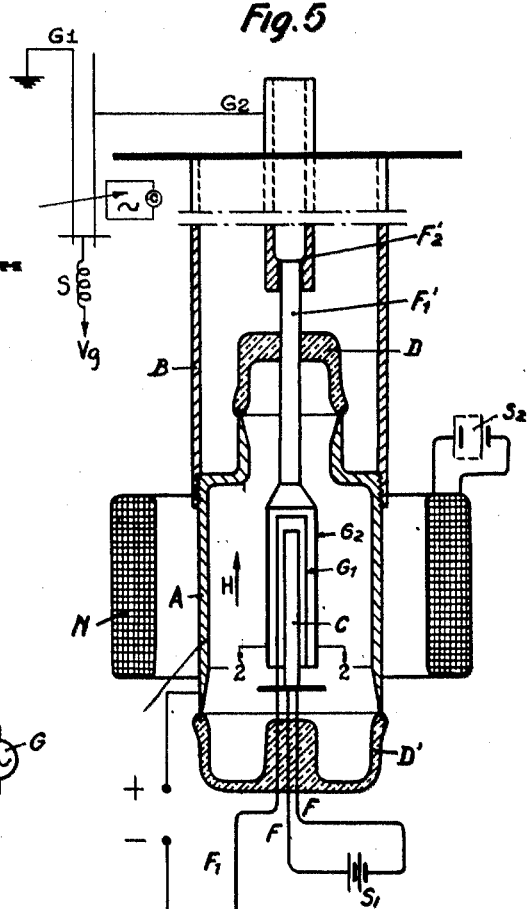
INVENTOR:
GEORGES BEZY
By John B Brody Jan. 27, 1953   G. BEZY   2,627,050
ELECTRONIC DEVICE FOR VERY HIGH FREQUENCIES
Filed May 14, 1947   2 SHEETS—SHEET 2
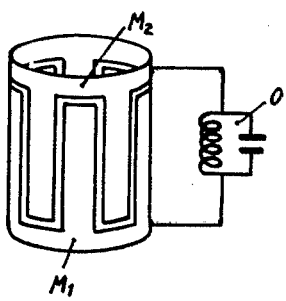
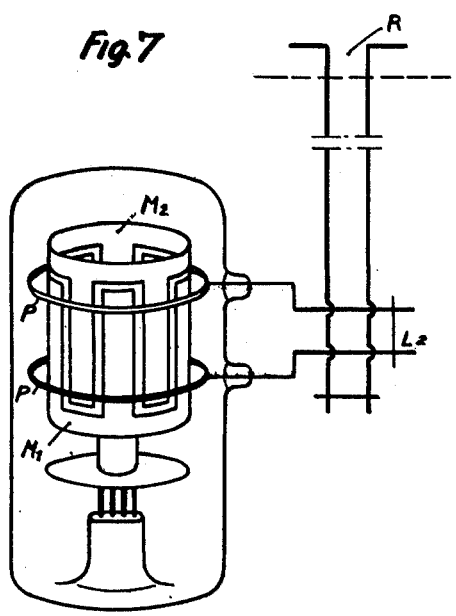
INVENTOR:
GEORGES BEZY

Patented Jan. 27, 1953

2,627,050

UNITED STATES PATENT OFFICE 2,627,050

ELECTRONIC DEVICE FOR VERY HIGH FREQUENCIES

Georges Bezy, Paris, France, assignor to Compagnie Generale de Telegraphie Sans Fil, a corporation of France Application May 14, 1947, Serial No. 747,961
In France October 3, 1940

Section 1, Public Law 690, August 8, 1946
Patent expires October 3, 1960

6 Claims. (Cl. 315—3)

The present invention relates to an electronic device operable to produce or amplify electric energy at very high frequency.

The object of my invention is to provide an electronic tube and associated circuit for velocity modulation of electronic energy at very high frequencies.

My invention is described in detail in the specification hereinafter following by reference to the accompanying drawings, in which:

Figure 1 is a diagrammatic view of a velocity modulated tube system embodying my invention;

Fig. 2 is a detail view of one form of cathode system and associated electrodes in the velocity modulated tube system embodying my invention, the view being taken substantially on line 2—2 of Fig. 5 on an enlarged scale;

Fig. 3 is a diagrammatic view of the arrangement of the electrodes in the tube system of my invention for purposes of explaining the operation of the velocity modulation system;

Fig. 4 shows a circuit arrangement for one method of exciting the modulation grid in the velocity modulation system of my invention;

Fig. 5 is a longitudinal sectional view through a velocity modulated valve operating in accordance with my invention and showing schematically the electrical circuits of Fig. 4 associated therewith;

Fig. 6 is a perspective view of one form of anode and circuit associated therewith which may be employed in the system of my invention; and Fig. 7 schematically shows one manner of coupling a radiation system with the velocity modulated tube system of my invention.

The device comprises essentially a valve which may be considered as an improvement upon the magnetron, in which the electrons emitted by a cathode C are grouped in any number of flat pencils as shown in Fig. 1. The cathode may be shaped so as to permit the effect of an electronic lens as represented in Fig. 2. In such a case, the shape of the cathode and the presence of the uprights M located in front of the points of the cathode raised to a suitable potential approximating the potential of the cathode coact to arrange or form the electrons into beams which can pass into the modulation slots without dissipating energy on the grids $G_1 G_2$.

The beams of electrons are modulated in velocity on passing between two grids $G_1$ and $G_2$, between which there is a high frequency alternating potential Fig. 3.

A magnetic field parallel to the modulation slots acts between the grid $G_2$ and the anode A, the interior of the modulation cylinder not being subjected to the action of this magnetic field. This result is obtained by constructing the external grid $G_2$ in chromed or ferro-chromed nickel of sufficient thickness.

The beams of electrons modulated in velocity describe curved trajectories under the influence of the magnetic field.

If it be supposed that this field is regulated so as to block the electrons issuing with a velocity corresponding to a zero acceleration during the passage between the two modulation grids, only the accelerated electrons reach the anode, all the retarded electrons describing closed trajectories.

For the sake of simplicity only two kinds of electrons will be considered, namely slow and rapid ones, as many investigators in the realm of velocity modulation valves have done, it will be seen that along the trajectory "ab" Fig. 3 only rapid electrons will be encountered, the slow electrons which were between these rapid electrons describing the trajectory "ad."

The transformation of velocity modulation into density modulation is effected by acting on the electronic trajectories.

Fig. 4 comprises a diagrammatic illustration of one method of effecting the excitation of the modulation grids $G_1$ and $G_2$, which are connected to the conductors of a Lecher line $L_1$ inductively coupled to a very high frequency generator G, and directly connected through the intermediary of a choking coil S, with a source of continuous polarization $V_g$.

The high frequency energy may be extracted by continuing the anode externally by the external conductor of a concentric transmission line, the inner conductor being for example the extension of the modulation grid $G_2$.

The valve can operate as an auto-oscillator and as a high frequency amplifier. It is capable of a semi-metallic construction in which case the anode can be cooled by any fluid which will increase its capacity to dissipate heat.

Fig. 5 illustrates in longitudinal section an embodiment of a valve according to the present invention in which a cathode C is heated indirectly by the conductors FF supplied by the source of potential $S_1$. The cathode C is surrounded by the modulation grids $G_1$ and $G_2$ in the form of coaxial cylinders having longitudinal slots in the manner indicated in Figure 1. The grid $G_1$ is earthed by the conductor $F_1$. The grid $G_2$ is connected to the exterior by the conductor $F'_1$ an extension of which comprises the core $F''_2$ which is concentric with the metallic cylinder B, forming an extension to the anode A. A magnetic field, the direction H of which is parallel to the axis of the valve, is created by a coil N supplied by the source of potential $S_2$. The space formed by the anodic cylinder A is sealed at each end by an insulating material D and D', such as glass or the like.

The cathode may, in the case of indirect heating, be shaped in the manner indicated above; it may, however, comprise filaments in pure metals or with a mono-atomic coating or covered with oxide, in which case, a suitably machined central piece could also be employed to focalize the electrons emitted by each of the filaments, a modulation slot being arranged to correspond to each of the beams of electrons.

According to an embodiment of the invention having a glass envelope, the anode is slit and the number of segments is double the number of beams of electrons. The segments are combined into two groups $M_1 M_2$ shown in Fig. 6 connected respectively to the terminals of an oscillating circuit O such as Lecher lines, concentric circuit, etc.... The coupling with the Lecher line $L_2$ can be effected by means of two loops P shown in Fig. 7 coupled to the two sets of segments $M_1 M_2$ composing the anode. A doublet couple R for example can operate to radiate the high frequency energy produced.

The valve according to the present invention, as also the excitation and employment circuits are, naturally, capable of numerous modifications along the lines indicated without departing from the spirit of the invention.

What I claim is:

1. An electronic tube comprising a rectilinear cathode formed for concentrating the electrons emitted by the cathode in several flat beams contained in radial planes, a pair of concentric electrodes comprising an external electrode surrounding an internal electrode, the latter surrounding the cathode, said electrodes consisting of cylindrical segments separated by slots parallel to said cathode to be traversed by said flat beams of electrons, means connected to said electrodes for applying to this pair of electrodes an ultra high frequency potential for modulating the electron speed, an anode concentrically surrounding said pair of electrodes and connected with an acclerating potential source, and means adjacent said tube for producing in the space traversed by said electron beams, a unidirectional magnetic field parallel to said cathode for deflecting said beams in the plane perpendicular to said cathode.

2. An electronic tube as set forth in claim 1, wherein the external electrode is of ferromagnetic metal.

3. A tube as set forth in claim 1 and output means connected between the anode and the external electrode.

4. An electronic tube as set forth in claim 1, wherein the anode is composed of a number of segments equal to twice the number of said slots, the segments being alternately interconnected in two sets.

5. An electronic tube as set forth in claim 1, wherein the anode and the external electrode are extended to form a concentric line.

6. An electronic tube as set forth in claim 1, wherein the anode is composed of a number of segments equal to twice the number of said slots, the segments being alternately interconnected in two sets, axially spaced rings coupled with said anode and an output circuit connected to said rings.

GEORGES BEZY.

REFERENCES CITED

The following references are of record in the file of this patent:

UNITED STATES PATENTS

| Number | Name | Date |
| --- | --- | --- |
| 1,851,549 | Thompson | Mar. 29, 1932 |
| 2,117,098 | Linder | May 10, 1938 |
| 2,197,041 | Gray | Apr. 16, 1940 |
| 2,298,949 | Litton | Oct. 13, 1942 |
| 2,358,542 | Thompson | Sept. 19, 1944 |
| 2,402,983 | Brown | July 2, 1946 |
| 2,466,063 | Varian | Apr. 5, 1949 |